United States Patent Office 2,884,471
Patented Apr. 28, 1959

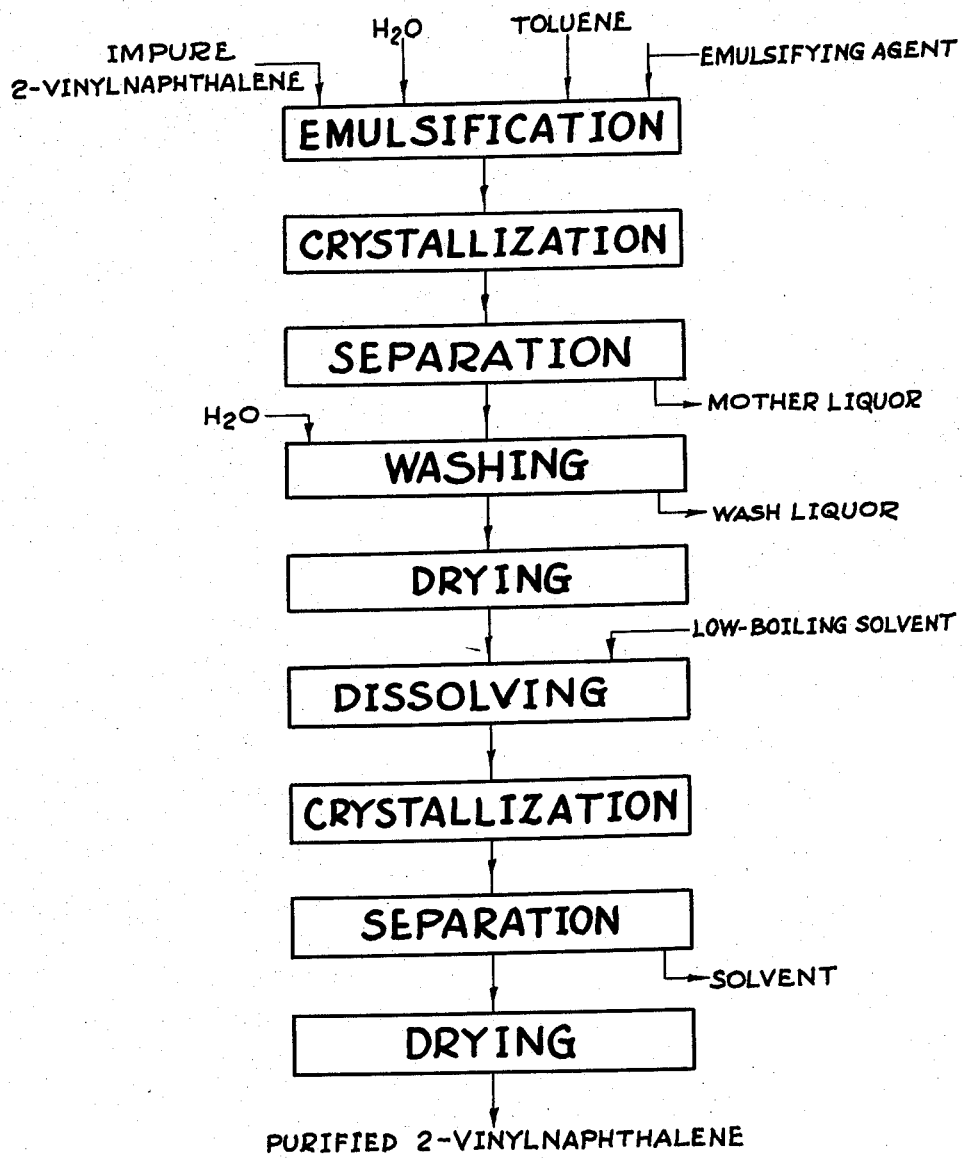

2,884,471

PURIFICATION OF 2-VINYLNAPHTHALENE

Gerd Leston, Verona, and Thomas E. Robbins, Jr., Pittsburgh, Pa., assignors to Koppers Company, Inc., a corporation of Delaware Application July 2, 1954, Serial No. 440,978

15 Claims. (Cl. 260—674)

This invention relates in general to the purification of 2-vinylnaphthalene. More particularly this invention is directed to a process for the purification of 2-vinylnaphthalene by crystallization wherein 2-vinylnaphthalene is emulsified in a non-solvent such as water, and 2-vinylnaphthalene of improved purity is thereafter separated from the non-solvent.

Heretofore the purification of 2-vinylnaphthalene has presented many problems. Numerous attempts have been made to obviate these problems and difficulties but these endeavors in general have been unsatisfactory. A salient difficulty connected with the purification has been the ease with which 2-vinylnaphthalene undergoes polymerization. For example, distillation purification has been unsatisfactory due to the polymerization of the 2-vinylnaphthalene during the heating operation. Various inhibitors have been added to the still which inhibit polymerization of the 2-vinylnaphthalene in the still pot but which do not inhibit polymerization in the distillation column. Vacuum distillation at an absolute pressure of about 1 millimeter of mercury can be carried out without polymerizing the 2-vinylnaphthalene but this distillation technique is not too desirable from an economic standpoint.

It is therefore an object of this invention to provide a process for the purification of impure 2-vinylnaphthalene by crystallization wherein the 2-vinylnaphthalene is emulsified in a non-solvent such as water and a 2-vinylnaphthalene of improved purity is thereafter separated from the mother liquor.

Another object of this invention is to provide a process for the purification of impure 2-vinylnaphthalene wherein the 2-vinylnaphthalene is first emulsified in a non-solvent such as water and then separated from the mother liquor; and thereafter dissolved in a low-boiling solvent such as, for example, hexane and then separated from the solvent to provide a 2-vinylnaphthalene of an improved purity.

An additional object is to provide a process whereby 2-vinylnaphthalene can be purified notwithstanding that a portion of the 2-vinylnaphthalene may be polymerized in the process.

A further object is to provide a process for the purification of 2-vinylnaphthalene which will obviate the difficulties of the prior art.

Ancillary and additional objects and advantages, if not specifically set forth herein, will be readily apparent to one skilled in the art from the following detailed description of the invention.

It has now been found that a purified 2-vinylnaphthalene is obtained by emulsifying impure 2-vinylnaphthalene at a temperature of at least about 50° C. and advantageously at about 66° C., in water with a small amount of emulsifying agent; lowering the temperature of the emulsion to crystallize the 2-vinylnaphthalene while the impurities remain dispersed in the mother liquor; and thereafter separating the product to give a purified crystalline 2-vinylnaphthalene fraction and an impurities-containing fraction of mother liquor. Excellent results have been obtained when the temperature at which the emulsification has been carried out is within the range of approximately 50–100° C.

The water which is utilized in the emulsification step and which can be utilized in the hereinafter-described washing operation, if desired or required, is advantageously water which has been purified by, for example, distillation or by treatment with ion exchange resins, etc., although hard water or tap water, etc. can be employed, if desired, with no serious effects on the purity of the product 2-vinylnaphthalene.

A purified 2-vinylnaphthalene can be obtained in accordance with this invention by carrying out the emulsification at a water-2-vinylnaphthalene weight ratio of about 1:1 and even slightly less. These is no upper limit to the amount of water that can be utilized in the emulsification and the impure 2-vinylnaphthalene could be emulsified, if desired, in an infinite quantity of water. Good results have been obtained when the emulsification has been carried out at a crude 2-vinylnaphthalene-water weight ratio of 1:4. A purified 2-vinylnaphthalene can be obtained by employing 0.5% by weight of emulsifying agent based on the weight of the incoming 2-vinylnaphthalene. Emulsifying agent in the amount of from about 1 to about 4 parts by weight per 100 parts by weight of the 2-vinylnaphthalene has been found to give excellent results. A quantity of emulsifying agent substantially greater than 4 parts by weight can be employed, if desired. However, if an extremely large amount of emulsifying agent is utilized, the purity of the final 2-vinylnaphthalene might be deleteriously affected, and the yield of 2-vinylnaphthalene might be lowered due to emulsification of part of the 2-vinylnaphthalene. The emulsification is carried out advantageously with high-speed agitation by means of, for example, a small-sized agitator such as a small-sized marine-type propeller. High-speed agitation of from about 500 r.p.m. to 12,000 r.p.m. or more gives excellent results in this emulsification step.

It has been found advantageous to cool the emulsion gradually over a period of at least about 30 minutes inasmuch as crystals of sufficient size to be separated are then produced, and undesirable coagulation of the 2-vinylnaphthalene on the surface of the mother liquor does not occur. A cooling time of approximately 2 hours has been found to be particularly advantageous. Any suitable means may be utilized for cooling the emulsion to crystallize out the naphthalene. Stirring by means of, for example, a high-speed marine-type propeller wherein the emulsion is cooled by the natural convection and conduction of the room has been found to be an advantageous method of cooling the emulsion. However, cooling by means of a fan can be employed, if desired.

The purified 2-vinylnaphthalene, after it is separated from the impurities-containing mother liquor, is advantageously washed. This washing may be carried out by either slurry washing wherein the separated 2-vinylnaphthalene is repulped in water or by washing the separated 2-vinylnaphthalene on the filter or the centrifuge. It is to be understood that washing is not essential where a small amount of emulsifying agent or other material is not harmful to the product 2-vinylnaphthalene. When it is advantageous to wash the purified 2-vinylnaphthalene, the washing can be carried out once or twice, or as many times as desired by the aforesaid slurry washing or by washing the purified 2-vinylnaphthalene on the filter. The resultant slurry is then separated by any suitable method such as by filtering with, for example, a Büchner funnel, a filter press of the plate and frame type, a drum type continuous filter, etc., wherein any suitable filter media such as, for example, cloth filter media, filter paper, porous media, etc. can be employed; or by centrifuging with a batch centrifuge or a continuous centrifuge in plant operations.

The wet, purified, 2-vinylnaphthalene can be dried by vacuum distillation or by decantation although other suitable drying means can be employed.

The invention may be more thoroughly understood by reference to the accompanying drawings in which:

Fig. 2 is a flow sheet illustrating an additional embodiment of this invention. Parts and percentages given herein are by weight unless otherwise specified.

Figure 1:
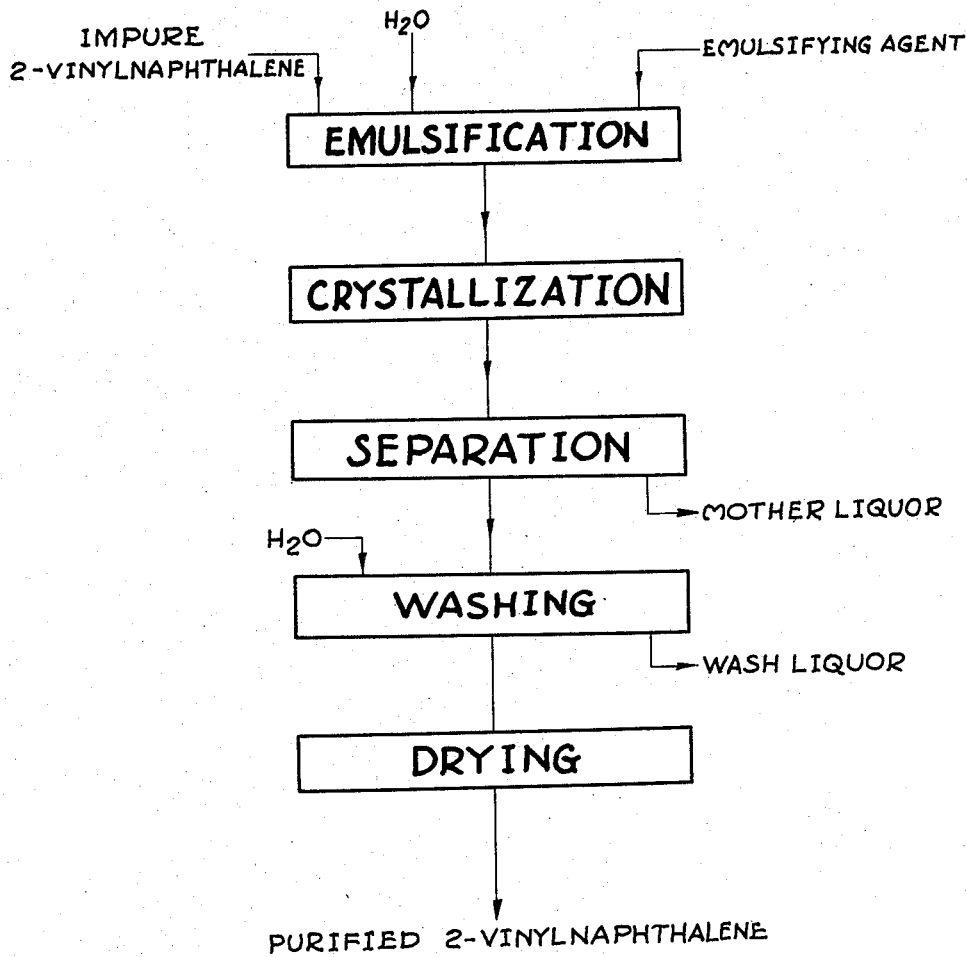
Fig. 1 is a flow sheet illustrating one embodiment of the invention.

In accordance with the procedure illustrated in Fig. 1, newly-incoming impure 2-vinylnaphthalene is emulsified at a temperature of at least about 50° C. and advantageously at about 66° C. in water with a small amount and advantageously from about 1 to about 4 parts by weight (per 100 parts by weight of the 2-vinylnaphthalene) of an emulsifying agent such as, for example, an alkali metal soap of a higher fatty acid such as, for example, sodium oleate.

A solvent that is substantially immiscible with water but which is a solvent for 2-vinylnaphthalene and its impurities such as, for example, toluene can be advantageously added to this mixture and mixed therewith to improve still further the purity of the product. Improved results have been obtained by adding as little as 1% by weight of toluene (based on the weight of the 2-vinylnaphthalene), and as much as 10% by weight (based on the weight of the 2-vinylnaphthalene). However, less than 1% by weight of toluene can be added and more than 10% by weight can be added to the mixture, if desired. The more toluene that is added, the more pure the product 2-vinylnaphthalene will be but also the lower the yield will be as less 2-vinylnaphthalene will crystallize out as the amount of toluene is increased. In place of the toluene, petroleum ether, chloroform and carbon tetrachloride can be employed, if desired. This emulsification is advantageously carried out with high speed or vigorous agitation as is hereinbefore described. The temperature of the emulsion is then lowered to crystallize out the 2-vinylnaphthalene while the impurities, including any ethylnaphthalene and polymerized 2-vinylnaphthalene that might be present, remain dispersed in the mother liquor. This temperature to which the emulsion is cooled to crystallize out the 2-vinylnaphthalene will vary with the degree of purity of the 2-vinylnaphthalene. Temperatures of 50° C. or 45° C. would be suitable for crystallizing 2-vinylnaphthalene of a high degree of purity. However, lower temperatures of crystallizations are necessary with less pure grades of 2-vinylnaphthalene. Thus the emulsion may be cooled down to as low as +10° C. and even lower to crystallize out the 2-vinylnaphthalene. The mixture of 2-vinylnaphthalene crystals in mother liquor is then separated by filtration or centrifuging, etc., into a crystalline 2-vinylnaphthalene fraction of mother liquor which can be discarded or recycled. The separated crystalline 2-vinylnaphthalene fraction is then advantageously washed by the hereinbefore-described washing operation and thereafter separated from the wash liquor and dried by one of the previously described separation and drying methods. This emulsion crystallization process according to the flow sheet of Fig. 1 can be advantageously repeated two or three times.

The following specific examples are illustrative of a typical procedure according to the process illustrated in the flow sheet of Fig. 1, parts being by weight unless otherwise specified.

*Example I*

37.5 parts of 2-vinylnaphthalene (70% pure, melting point 45°–52° C.), 150 parts of distilled water, and 1.5 parts of sodium oleate were heated to 70° C. and mixed in an indented flask by means of a high-speed stirrer. Stirring was continued until the mixture had cooled down to 35° C. Cooling below 35° C. was accelerated by continued stirring and by directing an air stream from an electric fan at the flask. At 30° C. the mixture was filtered by means of a Buchner funnel provided with a filter cloth. The product was washed with water and dried in a vacuum desiccator for 12 hours. This 2-vinylnaphthalene melted at 52–57° C. A second emulsion crystallization raised the melting point to 54.5–58.5° C., and a third emulsion crystallization raised the melting point to 56.5–59° C. When the third emulsion crystallization was carried out with 2.1 parts of toluene, the melting point was raised to 59.5°–61.5° C.

*Example II*

10 parts of 2-vinylnaphthalene having a melting point of 62–63° C., 20 parts of distilled water, and 0.2 part of sodium oleate were introduced into a baffled flask and heated to 75° C. with stirring by means of a stainless steel three-blade marine-type propeller. The emulsion was allowed to cool with stirring over a period of 2 hours during which the temperature dropped to 35° C. The mixture was then filtered on a Buchner funnel provided with a filter cloth and the filter cake was washed twice with distilled water. This 2-vinylnaphthalene melted at about 63.5–64° C.

*Example III*

The procedure of Example II was repeated with 5 parts of 2-vinylnaphthalene having a melting point of 62–63° C., 20 parts of distilled water, 0.1 part of sodium oleate and 0.4 part of toluene. A 2-vinylnaphthalene having a melting point of 64° C. was obtained.

Other surface active agents can be employed as emulsifying agents in the foregoing embodiment of this invention and the hereinafter-described embodiment in place of the surface active agents disclosed. For example, the alkali metal salts of higher fatty acids having from 12 to 18 carbon atoms, viz., the sodium or potassium salts of linoleic, stearic, palmitic, myristic, oleic and linolenic can be employed. Additionally the sodium salts of the commercial fatty acids sold under the trademarks "Neo-Fat S–142" (46% oleic, 39% linoleic, 3% linolenic, 12% rosin acids); "Neo-Fat D–142" (50% oleic, 40% linoleic, 4% linolenic, 6% rosin acids); "Emersol 201" (technical grade of oleic acid); and "Emery 500 fatty acid" (32–35° C. titer and 13% unsaponifiable) are desirable surface active agents for utilization as emulsifying agents. Examples of other emulsifying agents which are eminently adapted for the practice of this invention are alkyl-aryl sulfonates such as, for example, sodium dodecylbenzene sulfonate, sodium alkyl naphthalene sulfonates, etc. Other surface active materials which are highly suited for utilization in the foregoing embodiment of this invention and hereinafter-described embodiment (as exemplified by the flow sheets of Figs. 1 and 2) include materials marketed under the trademarks "Surf" (alkyl-aryl sulfonate the surface active constituents); "Nacconol NRSF" (alkyl-aryl sulfonate the surface active constituent); "Dreft" (sodium lauryl sulfate the surface active constituent); "Victawet 58B" ((Octyl-2)$_8$ (P$_3$O$_{10}$)$_2$Na$_6$ the surface active constituent); "Antaron R–275" (alkyl naphthalene sulfonate); "Aerosol OT" (sodium salt of di-octyl sulfosuccinate); compounds of the general formula R—N(CH$_3$)$_3$Cl where R is a C$_{12}$–C$_{18}$ carbon chain; "Rosinate No. 214" (potassium soap of rosin acids); "Dresinate 731" (sodium soap of rosin acids); stearamidopropyldimethyl-B-hydroxyethyl - ammonium chlorides, and "Armour Re-Nu" (70% potassium soap of rosin acids, 30% potassium soap of a mixture of 50% oleic and 50% linoleic acids).

With reference now to the procedure exemplified by Fig. 2 which illustrates an additional embodiment of this invention, newly-incoming impure 2-vinylnaphthalene is first subjected to the emulsion crystallization purification process which is hereinbefore-described with regard to Fig. 1. However, the 2-vinylnaphthalene which is first purified by this emulsion crystallization process need not be dried in this embodiment before being recrystallized from the low-boiling solvent. The 2-vinylnaphthalene which has been rendered more pure by the aforesaid emulsion crystallization is then dissolved in a low-boiling solvent such as, for example, hexane. However, other low-boiling solvents can be employed in place of hexane such as, for example, methanol, ethanol, petroleum ethers and paraffin hydrocarbons containing from 3 to 7 carbon atoms. Excellent results have been obtained when the weight ratio of hexane or other low-boiling solvents to 2-vinylnaphthalene has ranged from about 5:1 to about 6:1. However, weight ratios of low-boiling solvent to 2-vinylnaphthalene of approximately 1:1 and in certain instances even lower, to as high as 10:1 or higher can be employed, if desired. This dissolving is ordinarily carried out at room temperature. However, when methanol is the low-boiling solvent employed, it has been found advantageous to warm the methanol to about 35° C. while dissolving the 2-vinylnaphthalene. A small amount of activated charcoal can be added to the mixture at this stage, if desired.

The solution is then cooled down to a temperature of from about 25° C. to about −80° C. to crystallize out the 2-vinylnaphthalene while the impurities remain in solution. The 2-vinylnaphthalene crystals are then separated from the low-boiling solvent by filtration, centrifuging, etc. The filter cake can then be washed, if desired, with this low-boiling solvent and then, if desired, dried by being subjected to reduced pressure at room temperature or by means of a drying oven with the temperature being maintained low enough to avoid polymerization, or by simply being subjected to the atmosphere to permit the solvent to evaporate, or by any other suitable drying means. This recrystallization from low-boiling solvent is advantageously repeated three or four times.

The following specific examples are illustrative of a typical procedure according to the process illustrated by the flow sheet of Fig. 2, parts being by weight unless otherwise specified.

*Example IV*

100 parts of crude 2-vinylnaphthalene was first purified by emulsion crystallization according to Example I. The purified 2-vinylnaphthalene product of Example I, which had a melting point of 59.5–61.5° C. was then dissolved in hexane in the weight ratio of hexane to 2-vinylnaphthalene of 6:1. About 4 parts of charcoal was added and the mixture was stirred for about 5 minutes and the charcoal was filtered off. The solution was cooled down to −20° C. and the 2-vinylnaphthalene crystals were then filtered from the solvent by means of a Büchner funnel provided with filter paper. This crystallization from hexane was repeated 3 more times. The crystals were dried by being subjected to a vacuum at room temperature. The product 2-vinylnaphthalene had a melting point of 65–65.2° C.

*Example V*

2-vinylnaphthalene having a melting point of 62–64° C. was dissolved in hexane in the weight ratio of hexane to 2-vinylnaphthalene of 5:1. 2 parts of activated carbon were added to the mixture. The mixture was stirred and the carbon was filtered. The filtrate was then cooled to 80° C., and the 2-vinylnaphthalene crystals were then filtered from the solvent by means of a Büchner funnel provided with a filter paper. The crystals were dried in a vacuum chamber at room temperature. The product 2-vinylnaphthalene had a melting point of 64.8–65.5° C.

*Example VI*

The product 2-vinylnaphthalene of Example II (melting point 62–64° C.) was dissolved in hexane in the weight ratio of hexane to 2-vinylnaphthalene of 6:1. The solution was cooled down to −80° C. and the 2-vinylnaphthalene crystals were then filtered by means of a Büchner funnel provided with filter paper. The crystals were dried in a vacuum chamber at room temperature. The product 2-vinylnaphthalene had a melting point of 64.5–65.3° C.

*Example VII*

The product 2-vinylnaphthalene of Example III (melting point 63.5–64) was dissolved in hexane in the weight ratio of hexane to 2-vinylnaphthalene of 7:1. 0.1 part of activated carbon was added to the mixture and the mixture was stirred and the carbon filtered. The solution was cooled down to a temperature of −80° C., and the 2-vinylnaphthalene crystals were then filtered from the solvent by means of a Büchner funnel provided with a filter paper. The crystals were then dried in a vacuum chamber at room temperature. The product 2-vinylnaphthalene had a melting point of 65.0–65.8° C.

The results produced by the embodiments of this invention are both novel and unexpected inasmuch as one would expect virtually all of the 2-vinylnaphthalene to be polymerized at the temperature of emulsification and this process therefore to be inoperative. On the contrary, only a small portion of the 2-vinylnaphthalene undergoes polymerization and this polymeric material is emulsified and the monomer separated therefrom with good results.

What is claimed is:

1. A process for the purification of 2-vinylnaphthalene comprising: emulsifying impure 2-vinylnaphthalene at a temperature of at least about 50° C. in water with about 1–4% by weight of emulsifying agent; lowering the temperature of the emulsion to crystallize 2-vinylnaphthalene; and thereafter separating the crystalline 2-vinylnaphthalene from the mother liquor.

2. The process of claim 1 wherein the emulsifying agent is an alkali metal salt of a higher fatty acid.

3. A process according to claim 1 wherein the emulsifying agent is an alkali metal salt of an alkyl-aryl sulfonate.

4. The process of claim 1 wherein the emulsifying agent is a compound of the general formula: R—N(CH$_3$)$_3$Cl where R is a C$_{12}$–C$_{18}$ carbon chain.

5. The process of claim 1 wherein the emulsifying agent is the sodium salt of di-octyl sulfosuccinate.

6. The process according to claim 1 wherein the emulsifying agent is sodium lauryl sulfate.

7. A process for the purification of 2-vinylnaphthalene which comprises: emulsifying impure 2-vinylnaphthalene at a temperature of at least about 50° C. in water with a small amount of emulsifying agent; admixing a small amount of a water-immiscible solvent for impure 2-vinylnaphthalene with the mixture; lowering the temperature of the mixture to crystallize 2-vinylnaphthalene; and thereafter separating the crystaline 2-vinylnaphthalene from the mother liquor.

8. A process for the purification of 2-vinylnaphthalene comprising: emulsifying impure 2-vinylnaphthalene at a temperature of about 66° C. in water with approximately 1–4% by weight of an emulsifying agent; admixing a small amount of toluene with the mixture; lowering the temperature of the mixture to crystallize 2-vinylnaphthalene; and thereafter separating the crystalline 2-vinylnaphthalene from the mother liquor.

9. A process for the purification of 2-vinylnaphthalene comprising: emulsifying impure 2-vinylnaphthalene at a temperature of at least about 50° C. in water with about 1–4% by weight of emulsifying agent; lowering the temperature of the emulsion to crystallize 2-vinylnaphthalene; separating crystalline 2-vinylnaphthalene from the mother liquor; dissolving said crystalline 2-vinylnaphthalene in a solvent; lowering the temperature of the solution to from about 25° C. to about −80° C. to crystallize 2-vinylnaphthalene; and thereafter separating the crystalline 2-vinylnaphthalene from the solvent.

10. A process for the purification of 2-vinylnaphthalene comprising: emulsifying impure 2-vinylnaphthalene at a temperature of at least about 50° C. in water with a small amount of emulsifying agent; admixing a small amount of a water-immiscible solvent for impure 2-vinylnaphthalene with the mixture; lowering the temperature of the mixture to crystallize 2-vinylnaphthalene; separating the crystalline 2-vinylnaphthalene from the mother liquor; dissolving the crystalline 2-vinylnaphthalene in a solvent; lowering the temperature of the solution to from about 25° C. to about −80° C. to crystallize 2-vinylnaphthalene; and thereafter separating the crystalline 2-vinylnaphthalene from the solvent.

11. A process according to claim 10 wherein the solvent utilized to dissolve the crystalline 2-vinylnaphthalene fraction that has been subjected to emulsion crystallization purification is hexane.

12. A process according to claim 10 wherein the solvent utilized to dissolve the crystalline 2-vinylnaphthalene fraction that has been subjected to emulsion crystallization purification is methanol.

13. A process for the purification of 2-vinylnaphthalene which comprises: emulsifying impure 2-vinylnaphthalene at a temperature in the range of approximately 50–100° C. in water with from about 1% to about 4% by weight of emulsifying agent; lowering the temperature of the emulsion gradually over a period of at least about 30 minutes to crystallize 2-vinylnaphthalene; and thereafter separating the crystalline 2-vinylnaphthalene from the mother liquor.

14. A process for the purification of 2-vinylnaphthalene which comprises: emulsifying impure 2-vinylnaphthalene at a temperature in the range of approximately 50–100° C. in water with from about 1% to about 4% by weight of emulsifying agent; admixing from about 1% to about 10% by weight of a water-immiscible solvent for impure 2-vinylnaphthalene with the product of emulsification; lowering the temperature of the emulsion gradually over a period of at least about 30 minutes to crystallize 2-vinylnaphthalene; and thereafter separating the crystalline 2-vinylnaphthalene from the mother liquor.

15. A process for the purification of 2-vinylnaphthalene which comprises: emulsifying impure 2-vinylnaphthalene at a temperature in the range of approximately 50–100° C. in water with from about 1% to about 4% by weight of emulsifying agent; admixing from about 1% to about 10% by weight of a water-immiscible solvent for impure 2-vinylnaphthalene with the product of emulsification; lowering the temperature of the emulsion gradually over a period of at least about 30 minutes to crystallize 2-vinylnaphthalene; separating the crystalline 2-vinylnaphthalene from the mother liquor; dissolving the crystalline 2-vinylnaphthalene in a solvent in the weight ratio range of solvent to 2-vinylnaphthalene of from about 5:1 to about 6:1; lowering the temperature of the solution to from about 25° C. to about −80° C. to crystallize 2-vinylnaphthalene; and thereafter separating the crystalline 2-vinylnaphthalene from the solvent.

References Cited in the file of this patent
UNITED STATES PATENTS

| | | |
|---|---|---|
| 2,296,459 | Schutte | Sept. 22, 1942 |
| 2,424,841 | Nickels | July 29, 1947 |
| 2,475,977 | Meier | July 12, 1949 |
| 2,678,955 | Ogilvie | May 18, 1954 |
| 2,711,432 | Krzesz | June 21, 1955 |